Patented May 13, 1952

2,596,669

UNITED STATES PATENT OFFICE 2,596,669

PROCESS FOR MAKING FORTIFIED CELLULAR GLASS

Walter D. Ford, Port Allegany, Pa., assignor to Pittsburgh Corning Corp., Allegheny County, Pa., a corporation of Pennsylvania No Drawing. Application March 12, 1947, Serial No. 734,242

3 Claims. (Cl. 106—40)

The present invention relates to cellular bodies suitable for use as thermal insulation and it has particular relation to cellular bodies formed by bloating or cellulating partially fused glass.

One object of the invention is to provide a cellular glass which has a resistance to water or water vapor at elevated temperatures many times that of the materials now in use.

It has heretofore been proposed to prepare a highly cellulated body of glass suitable for use as heat insulative material and for various other applications, by heating a mixture of finely pulverized glass and an agent designed to give off gases at temperatures near the melting point or sintering point of the glass. The products as thus obtained were of light weight, high resistance to fire, and most chemical agencies including water at ordinary temperatures. However, the durability of the material with respect to certain agencies such as water at elevated temperatures was not all that might be desired because the alkali content of the glass tended to leach out, thus causing disintegration or deterioration of the product. Doubtless this action was promoted by reason of the high specific surface of the product. The products as prepared by the foregoing methods have enjoyed extensive commercial use but some limitations have been placed upon the amplication of the materials where water or water vapor at elevated temperatures might be encountered.

The present invention is based upon the discovery that finely pulverized silica, when incorporated with powdered glass, and a gassing agent in an amount of about 10 to 40% based upon the mixture prior to cellulation, has a capacity of greatly enhancing the resistance of the products obtained by cellulating the glass, to the action of water or moisture or similar agencies of deterioration at high temperatures. Exceptionally good results have been obtained by the incorporation of finely pulverized flint in appropriate amounts with the pulverized glass and gassing agent. However, the invention contemplates the use of other finely powdered forms of silica such as pulverized sand or the finely pulverulent mixtures of silica and glass constituting the waste sands from the grinding and polishing of the glass with a slurry of water and sand as an abrasive agent.

In the practice of the invention practically any form of glass susceptible of being sintered when in pulverulent state and bloated with a suitable gassing agent to form cellular bodies may be employed. Conventional lime soda silica glass is the most common form and probably the least expensive. Other components such as potassium, barium and boron in appropriate amounts to form the various conventional glasses that may be available as cullet may be present. Preferably this glass will contain a substantial amount of $SO_3$ (combined or dissolved). Glasses of appropriate content of $SO_3$ are obtained where the glass during the various melting operations is brought to a temperature of approximately 2500–2600° F. and not substantially above. At higher temperatures the glass tends to lose its sulfate content to an undesirable degree and if heating is stopped at lower temperatures, most glasses will contain excessive amounts of $SO_3$. The optimum content of $SO_3$ seems to be approximately .13%. It will be appreciated that if the sulfate content of the glass is too low it may be compensated in part by additions such as calcium sulfate in small amount, e. g. .1 or .2%. Since the $SO_3$ seems to act primarily as an oxygen supplying agent in the reactions involving the formation of gases to bloat the sintered glass, other oxygen supplying agents such as antimony trioxide, ferric oxide, arsenic trioxide or the like may be incorporated in appropriate amounts. Such amounts usually are within the range of .1 to .5%.

Silica for purposes of increasing the durability of the cellular glass is incorporated in an amount of .10 to 40% or 50%. Optimum results with respect to increase of durability are obtained with percentages of about 20% and above, the percentage being caluculated upon the basis of the complete batch of pulverized glass and silica. Spent sand for grinding and polishing plate glass with a surry of sand contains about 75 or 80% of silica and this may be substituted for silica. Corrections for the glass content may be made, that is, enough may be added to bring the silica content within the desired range. The spent sand may be purified of iron and other nonsilicous or glass constituents or unpurified spent sand may be employed. Of course it will be dried before use. The fortifying material (silica) is in a heterogeneous mixture with the glass and carbon of the foam glass mixture, before celluation. After celluation, the silica exists mostly as imbedded grains in the cell walls. Therefore, the addition of silica to the glass-carbon foam glass mix results in displacement of the glass from the mix. The effect of this displacement is to reduce the amount of sulfate normally available for combining with the carbon to generate the cellulating gases; hence, this condition must be offset either by increasing the normal sulfate content of the retained glass, or by mill additions of oxygen-supplying agents in amounts of 0.1% to 0.5%, as hereinbefore set forth.

Preferably the various components of the mixture are very finely powdered, for example so that they will pass a screen of 200 mesh and preferably to an average particle size of 5 microns ($2^{-4}$ inches in diameter) or even finer. There is apparently no minimum particle size except of course such as is imposed by the difficulty and costs of extremely fine grinding.

Best admixture of the various components of the batch is obtained by grinding together glass in the form of cullet, the silica and an appropriate gassing agent. Finely powdered carbon or carbonaceous materials such as carbon black, ground coal or the like is the gassing agent most commonly employed at the present time. It is employed in amounts within a range of about .1 to .5%. It reacts with certain of the oxides such as the sulfates above mentioned in the glass or with certain oxides that may be added to the batch to form bloating gases in the sintered glass mass.

Batches of crushed glass, silica and any of the various gas-producing agents above discussed, e. g. .17% of carbon black in thorough admixture with each other are formed by grinding cullet (usually coarse fragments of glass) on a ball mill or other type of mill until all components are reduced to desired particle size and are completely blended or mixed. Proper quantities of the mixture are then placed in molds of refractory material such as stainless steel and are heated to the sintering point of the glass content and preferably somewhat above, e. g. within a range of about 1400–1600° F. depending somewhat upon the sintering point of the glass. At these temperatures the particles of glass are cohered into a continuous, non-permeable phase of sufficient plasticity to admit of bloating without actual melting and flowing of the mass. The gassing agents decompose or react with the glass constituents, at the higher temperatures, to give off gases which are entrapped in the sintered mass and thus produce the desired bloating or cellulation.

Cellulation in the presence of the finely pulverized silica occurs in the substantially the same manner as where silica is not present and the finely pulverized particles of silica seen to be imbedded in and dispersed in the glass constituting the walls of the cells. Whether there is actual chemical combination to a substantial degree between the silica and the glass components is not as yet definitely established or disproven.

The heating operation involved in cellulating the glass is comparatively slow since the pulverized mixture of glass, silica, gassing agents is a poor conductor of heat and usually several hours, e. g. 3 to 5 hours or thereabout are required to bring it to completion. But this value will vary with the dimensions of the masses to be heated.

Any appropriate furnace may be employed in the heating operation, but a tunnel furnace equipped with a conveyor system such as a system of conveyor rollers of refractory material designed to carry the molds through the furnace at an appropriate rate is quite satisfactory. At the completion of the cellulating operation the molds may be stripped from the resultant cellular bodies and the latter may then be annealed. The annealing operation like the cellulating operation is comparatively slow since the cellular bodies are even poorer conductors of heat than the powders from which they are formed. Usually the annealing operation will require 15 or 25 hours and may be much slower, if the time can be afforded. Annealing of the bodies containing the finely pulverized silica requires much the same conditions as are required in the absence of the finely pulverized silica. Blocks or slabs formed as above described are trimmed to uniform and regular size and are suitable for use as insulative materials or as floats for fish nets, as life rafts and other applications.

The cellulated bodies obtained by application of the invention are of substantially the same properties with respect to tensile strength, crushing strength, workability and such like properties as the conventional cellular glass obtained without the addition of silica. The cellularity as indicated by the apparent density is high. Usually apparent density is within a range of .14 to .18. The cells are relatively small and uniformily distributed. The resistance to the action of moisture especially at high temperatures is much higher and may be several fold that of conventional materials.

Standarized comparative tests of their resistance to water at elevated temperatures were conducted by placing samples of the materials in an autoclave and subjecting them to the action of water at elevated pressures and temperatures. The resistance to moisture under the standardized conditions was determined by weighting the samples before and after treatment and also by breaking the samples and observing the depth of penetration of moisture into the cell structure. In preparing standard samples, cylinders of cellular product 4.4 cm. in diameter and 7.7 cm. in length were cut from the slabs or blocks with a core drill. These samples were wet with water, sponged off and weighed. The samples were immersed in water in an autoclave and brought to the temperature corresponding to 90 pounds pressure per square inch for a period of 2 hours. They were then allowed to cool in the autoclave. Subsequently, they were removed, excess water was sponged off and they were again weighed to determine the amount of water taken up. They were also broken and the depth of penetration of water measured in centimeters. Under the conditions described, a similar sample of common cellular glass will take up about 70 to 95 grams of water. Tests were conducted upon samples of cellular glass of various silica contents. These samples were prepared from batches containing .17% of carbon black. The results of tests conducted upon laboratory batches containing silica are tabulated as follows:

| Composition: Cullet+Silica content of mixture | Average Sp. Gr. | Average Water Penetration in cm. | Average Absorption in gr. |
|---|---|---|---|
| 20% Opal Flint | 0.160 | 0.60 | 42.43 |
| 20% Sand 12 Hr. grind | 0.173 | 0.68 | 43.76 |
| 40% Spent grinding sand | 0.171 | 0.39 | 16.03 |
| 30% Spent grinding sand | 0.159 | 0.59 | 25.29 |

Percentages as herein expressed are by weight.

The resistance to the action of moisture of the materials above described may be 5 or 6 times that of conventional materials.

The forms of the invention herein described

I claim:

1. A process for manufacturing fortified cellular glass resistant to permeation by water at elevated temperature, comprising the steps of providing an intimate mixture of finely pulverized glass, silica and carbon black, in proportions by weight of .1% to .2% carbon—10% to 40% silica—and the balance glass, heating the mixture in closed molds to a temperature sufficient to sinter the glass to enclose the silica and carbon black, raising the temperature sufficiently to effect a reaction between the glass and carbon to cellulate the sintered mass, and thereafter annealing the cellulated product.

2. A process for manufacturing fortified cellcular glass resistant to permeability by water at elevated temperatures, comprising the steps of providing a finely pulverized intimate mixture in proportions by weight of .1% to .2% carbon—10% to 40% silica—and the remainder glass, heating the mixture in closed molds to sinter the glass, raising the temperature of the sintered mass to cellulate the mass through reaction between the glass and carbon to form small substantially uniform closed glass cells impregnated with the silica, removing the cellulated product from the molds, and annealing the product.

3. A process for manufacturing cellular glass having increased resistance to permeability by moisture at elevated temperatures, comprising the steps of providing an intimate mixture of finely pulverized glass, carbon and silica, in proportions by weight of about 80% to 60%—0.1% to 0.2%—and 20% to 40%, respectively, heating the mixture in closed molds to a temperature sufficient to effect the softening and cohering of the glass particles without substantial chemical reaction between glass, carbon or silica, increasing the temperature of the cohered mass sufficiently to generate cellulating gases through chemical reaction between the glass and carbon without substantial reaction of the glass or carbon with the entrapped free silica.

WALTER D. FORD.

REFERENCES CITED

The following references are of record in the file of this patent:

UNITED STATES PATENTS

| Number | Name | Date |
| --- | --- | --- |
| 2,123,536 | Long | July 12, 1938 |
| 2,233,608 | Haux | Mar. 4, 1941 |
| 2,310,432 | Haux | Feb. 9, 1943 |
| 2,337,672 | Haux | Dec. 28, 1943 |

FOREIGN PATENTS

| Number | Country | Date |
| --- | --- | --- |
| 490,168 | Great Britain | Aug. 10, 1938 |